(12) United States Patent
Stout

(10) Patent No.: US 7,571,116 B1
(45) Date of Patent: Aug. 4, 2009

(54) SYSTEM FOR CONSUMER-TRANSACTION INFORMATION THAT FOLLOWS THE CONSUMER

(75) Inventor: J. Gregory Stout, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1432 days.

(21) Appl. No.: 09/588,037

(22) Filed: Jun. 5, 2000

Related U.S. Application Data

(63) Continuation-in-part of application No. 09/480,883, filed on Jan. 10, 2000, which is a continuation-in-part of application No. 08/957,757, filed on Oct. 24, 1997, now abandoned, which is a continuation-in-part of application No. 08/853,955, filed on May 9, 1997.

(60) Provisional application No. 60/137,575, filed on Jun. 4, 1999, provisional application No. 60/141,380, filed on Jun. 28, 1999.

(51) Int. Cl.
*G06Q 10/00* (2006.01)
(52) U.S. Cl. ............................................. 705/26; 705/1
(58) Field of Classification Search ................... 705/34, 705/14, 10, 2–4, 1, 26
See application file for complete search history.

(56) References Cited

U.S. PATENT DOCUMENTS

| | | | |
|---|---|---|---|
| 4,590,470 A | | 5/1986 | Koenig |
| 4,623,964 A | | 11/1986 | Getz et al. |
| 4,928,279 A | | 5/1990 | Muroi |
| 5,025,372 A | * | 6/1991 | Burton et al. .................. 705/14 |
| 5,144,115 A | | 9/1992 | Yoshida |
| 5,235,509 A | | 8/1993 | Mueller et al. |
| 5,459,306 A | * | 10/1995 | Stein et al. .................. 235/383 |
| 5,493,315 A | | 2/1996 | Atchley |
| 5,590,038 A | | 12/1996 | Pitroda |
| 5,642,485 A | * | 6/1997 | Deaton et al. .................. 705/14 |
| 5,696,909 A | | 12/1997 | Wallner |
| 5,732,400 A | | 3/1998 | Mandler et al. |

(Continued)

FOREIGN PATENT DOCUMENTS

EP 0 284 764 A3 10/1988

(Continued)

OTHER PUBLICATIONS

Obernorf, Sharon, "Points for loyalty", Catalog Age, Dec. 1997, vol. 14, No. 13, pp. 35.*

(Continued)

*Primary Examiner*—Gerald J. O'Connor
*Assistant Examiner*—Vivek D. Koppikar

(57) ABSTRACT

Apparatus and method for storing and retrieving consumer-transaction information. The method includes capturing transaction information regarding a consumer at a first merchant, storing the captured selection information on a server and applying that captured transaction information to a transaction involving the consumer at a second merchant. Before applying the captured transaction information, the consumer is identified in a transaction at the second merchant. The first and second merchants and the server may be communicatively coupled by means of an internet—perhaps even the Internet. The type of transaction information captured may include credit information or loyalty information. The second transaction may be initiated by a browser on a personal computer connected to the Internet.

20 Claims, 2 Drawing Sheets

U.S. PATENT DOCUMENTS

| | | | |
|---|---|---|---|
| 5,734,839 A | | 3/1998 | Enoki et al. |
| 5,739,512 A | | 4/1998 | Tognazzini |
| 5,806,045 A | * | 9/1998 | Biorge et al. .................. 705/14 |
| 5,836,051 A | | 11/1998 | Myers |
| 5,864,825 A | | 1/1999 | Kobayashi et al. |
| 5,883,810 A | | 3/1999 | Franklin et al. |
| 5,889,863 A | | 3/1999 | Weber |
| 5,899,980 A | | 5/1999 | Wilf et al. |
| 5,915,022 A | | 6/1999 | Robinson et al. |
| 6,009,411 A | * | 12/1999 | Kepecs ......................... 705/14 |
| 6,049,787 A | | 4/2000 | Takahashi et al. |
| 6,055,573 A | * | 4/2000 | Gardenswartz et al. ..... 709/224 |
| 6,101,482 A | * | 8/2000 | DiAngelo et al. ............. 705/26 |
| 6,336,099 B1 | * | 1/2002 | Barnett et al. ................. 705/14 |
| 6,424,949 B1 | * | 7/2002 | Deaton et al. ................. 705/14 |
| 6,574,606 B1 | * | 6/2003 | Bell et al. ..................... 705/14 |

FOREIGN PATENT DOCUMENTS

| | | |
|---|---|---|
| EP | 0 793 186 A2 | 9/1997 |
| EP | 0 855 687 A2 | 7/1998 |
| EP | 0 902 381 A2 | 3/1999 |
| EP | 0 969 430 A1 | 1/2000 |
| GB | 2 306 025 A | 4/1997 |
| GB | 2 213 276 A | 11/1997 |
| JP | 10 275191 | 10/1998 |
| WO | WO 97/49050 | 12/1997 |
| WO | WO 98/28699 | 7/1998 |
| WO | WO 98/41957 | 10/1998 |
| WO | WO 99/28830 | 6/1999 |
| WO | WO 99/66438 | 12/1999 |
| WO | WO 00/55729 | 10/2000 |
| WO | WO 00/67218 | 11/2000 |

OTHER PUBLICATIONS

Schofield, Jack, "Beenz means money Trading stamps, air-miles and their ilk have moved into cyberspace", The Guardian, Manchester, UK, Jul. 1, 1999, pp. 2.*

Littman, Margaret, "Growing firm helps Internet marketers get the point", Crain's Chicago Business, Jan. 12, 1998, vol. 12, No. 2, pp. 14.*

Herda, S. "Non-repudiation: Constituting evidence and proof in digital cooperation," Computer Standards and Interfaces, 17:69-79 (1995).

Steele, J., "Bottom Line", *San Francisco Daily Journal*, Jan. 12, 2000, p. 2.

Allan et al., U.S. Appl. No. 09/480,883, "An Electronic-Receipts Service".

* cited by examiner

SYSTEM FOR CONSUMER-TRANSACTION INFORMATION THAT FOLLOWS THE CONSUMER

This application claims the benefit of the filing date(s) of the following earlier application(s):

U.S. Patent Application No. 60/137,575, entitled, "A Web-Enabled Point-of-Sale Device," filed Jun. 4, 1999, naming Scott T. Allan, Timothy L. Droz, Alexander F. Fraikor, Jeffrey T. Miles and J. G. Stout as inventors, and commonly assigned to @POS.COM of San Jose, Calif. (formerly PenWare, Inc. of Sunnyvale, Calif.); and U.S. Patent Application No. 60/141,380, entitled, "An Electronic-Receipts Service," filed Jun. 28, 1999, naming Llavanya Fernando and Aziz Valliani as joint inventors, and commonly assigned to @POS.COM of San Jose, Calif.

This application is a continuation-in-part of:

U.S. patent application Ser. No. 09/480,883, entitled, "An Electronic-Receipts Service," filed Jan. 10, 2000, naming Scott T. Allan et al. as inventors, and commonly assigned to RECEIPTCITY.COM, INC., San Jose, Calif., itself a continuation-in-part of U.S. patent application Ser. No. 08/957,757, entitled, "Method and System for Automated Electronic Receipt of Transactions," filed Oct. 24, 1997 now abandoned, naming Aziz Valliani, et al. as inventors, and commonly assigned to RECEIPTCITY.COM, INC., San Jose, Calif., itself a continuation in part of U.S. patent Ser. No. 08/853,955, entitled, "Modular Signature and Data-Capture System and Point of Transaction Payment and Reward System," filed May 9, 1997, naming Aziz Valliani, et al. as inventors, and assigned to @POS.COM, INC. of San Jose, Calif.

Benefit U.S. Patent Applications No. 60/137,575, 60/141,380 and Ser. No. 09/480,883 are incorporated by reference herein.

BACKGROUND

This invention relates to electronic commerce. More specifically, this invention relates to tracking consumers along the sequence of point-of-sale platforms that they visit and having information generated from their activity at one POS platform accompany them to other POS platforms.

Nichtberger et al., U.S. Pat. Re-Issue No. 34,915 (1995), teaches a system for distributing, redeeming and clearing merchandise coupons. FIG. 1 illustrates a system including an operations center 8 cooperating with local stations 10. Each of the local stations 10 is located at, say, a supermarket where coupons are to be distributed and redeemed. The operations center 8 typically is centrally located with a view toward ease of communication between it and each of the local stations 10.

The operations center 8 contains a data-entry system 12, an image-capture system 14 and a central processing unit 16. The image-capture system 14 enables video images of the coupons to be presented at the separate stores.

Each of the local stations 10 includes an automated UPC scanning checkout system 18 and a local coupon distribution and redemption (CDR) unit 20. After the customer inserts a special card into the unit, the local CDR unit 20 presents an electronic display to the customer of the coupons which are available for redemption. The customer then selects the coupons which he or she wishes to redeem. The CDR unit 20 records the selection and makes information identifying the customer and the selected coupons available to each of the checkout stations which comprise the checkout system 18 of the supermarket.

At FIG. 4, Nichtberger describes a method for coupon selection (distribution) and redemption. Customers using a CDR unit 20 are initially presented with advertisements. Normally, the advertisements run until a special card is inserted into a card reader.

Immediately after recognizing the special card, the card reader checks the card to determine when the user previously accessed coupons in that type of retail outlet. Thereafter, the possibilities are several. If the card indicates that the user accessed the system in that type of retail outlet during some predetermined time period, a screen appears explaining that the card is not valid in that type of store for the remainder of the time period. If the user's last access to the coupons in that type of retail outlet was not during the most recent week, the customer proceeds to select coupons.

A screen is filled with coupons. The user has a predetermined time to choose coupons or to touch the "hold" or "next" space before a next screen filled with coupons is displayed. If a coupon is chosen, that choice is noted under the user account number.

After the last screen, a notation to the effect that the special card was used (including the period of such use) is recorded on the card. The customer's coupon selections are entered in a file.

Coupon-selection information is reported via a communications link to the local processor which controls the store's automated checkout (UPC code scanning) system. This facilitates a subsequent comparison of coupons selected to purchases made.

After the user has made his purchases, he goes to one of the checkout stations and presents his card to the attendant at the station. A card reader reads the card, and the checkout system 18 then automatically credits the customer for the coupons the customer has selected where there are corresponding purchases against which the coupons are to be applied.

Thereafter, information regarding the redeemed coupons is transmitted to the central processing unit 16 which then automatically debits the manufacturer who distributed the coupons and credits the supermarket corresponding to the local station 10 at which the coupon was redeemed.

The Nichtberger system, however, is limited in several respects. For example, the Nichtberger local stations 10 include both a CDR 20 and a scanning checkout system 18, indicating their placement at checkout lanes. This placement, however, requires that some checkout-lane space and availability be sacrificed to permit shoppers to make pre-shopping coupon selections in the checkout-lane space. Retailers are loathe to reduce the throughput of their registers—for fear of frustrating and ultimately alienating customers.

Further, the operating center 8 communicates with multiple local stations 10. These local stations are located within one retailer only.

Finally, Nichtberger requires that any redemption of coupons 120 occurs at a location having a CDR unit 20. The CDR unit 20 allows a customer to identify himself to the local station 10. POS platforms that do not include the equipment for processing the special coupon cards cannot enjoy the benefits of the Nichtberger system.

It is desirable, therefore, to better use the limited, valuable space in checkout lanes by not selecting coupons at the POS platform (except under certain circumstances—the consumer is making coupon selections while checking out, for example).

It is further desirable to carry the coupon-selection information as well as other information from the coupon-selection device to whatever POS platform the consumer visits. Different consumer platforms may be in different retailers.

Finally, it is desirable to eliminate the need for specific CDR units.

These and other goals of the invention will be readily apparent to one of skill in the art on reading the background above and the description below.

SUMMARY

Herein are described apparatus and methods for storing and retrieving consumer-transaction information. The method includes capturing transaction information regarding a consumer at a first merchant, storing the captured selection information on a server and applying that captured transaction information to a transaction involving the consumer at a second merchant. Before applying the captured transaction information, the consumer is identified in a transaction at the second merchant.

The first and second merchants and the server may be communicatively coupled by means of an internet—perhaps even the Internet. The type of transaction information captured may include credit information or loyalty information.

The second transaction may be initiated by a browser on a personal computer connected to the Internet.

DESCRIPTION OF SPECIFIC EMBODIMENTS

Figure 1:
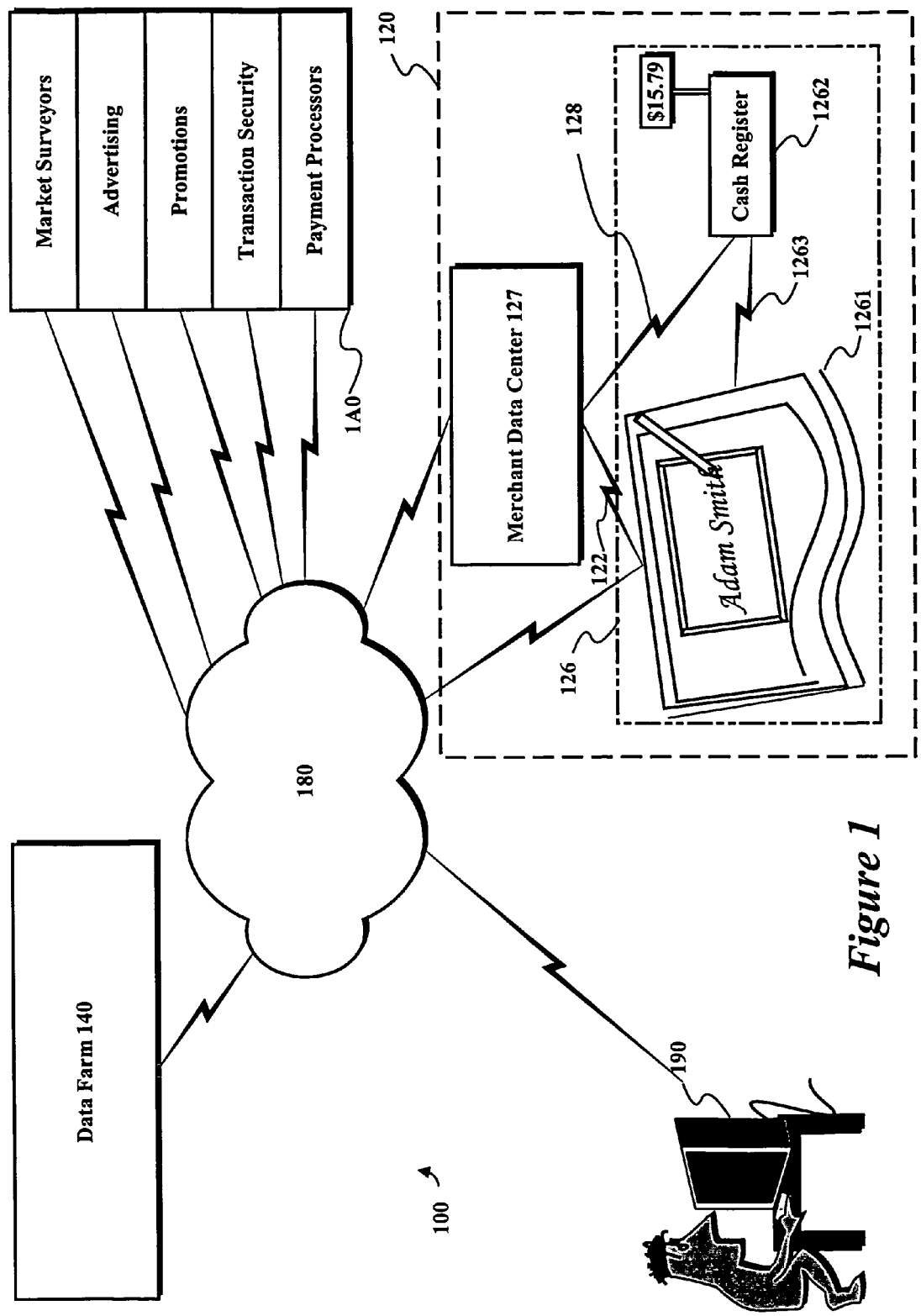
FIG. 1 is a diagram illustrating an electronic transaction system incorporating one embodiment of the invention.

FIG. 1 is a diagram illustrating an electronic transaction system 100 incorporating one embodiment of the invention. The system 100 includes one or more merchants 120, a central data farm 140 and a personal computer 190. The system 100 also includes communications link 180.

Where the link 180 is an internet, the merchant(s) 120 and the data farm 140 are each communicatively connected as hosts on that internet 180. The internet 180 allows any one host to communicate with any other. The personal computer 190 is viewed as a host on the internet 180, although its actual status is more likely to depend on the directness of its connection to that internet 180—through optional service providers not shown, for example.

A merchant 120 may include a merchant data center 127 and one or more point-of-sale (POS) systems 126. A POS system 126 and the merchant data center 127 communicate over a communications link 128 (typically a serial link) or a communications link 122. In addition to communicating using the link(s) 128, 122, the POS system 126 is communicatively connected as a host on the internet 180, allowing communication with any other host on the internet 180.

In one embodiment, the POS system 126 includes a portion 1262 that is typically a non-web-enabled cash register (although the portion 1262 may be web-enabled). An optionally web-enabled portion 1261 is herein termed the "transaction computer." A communications link 1263 may communicatively couple the portions 1261, 1262. The web-enabled transaction computer 1261 connects the POS system 126 to the internet 180.

The POS system 126 may integrate the typically non-web-enabled ("cash-register") and web-enabled portions 1262, 1261 of the POS payment platform, may maintain them distinct from but directly connected to each other or may only associate the non-web-enabled and web-enabled portions 1262, 1261 of the POS platform (i.e., indirectly connect the cash-register and interactive web-enabled portions 1262, 1261 of the payment platform.) Alternatively, the POS system 126 may omit the non-web-enabled portion 1262 of the POS platform altogether, as would typically be the case with small merchants 120.

The web-enabled transaction computer 1261 is of a type known in the art. The iPOS TC (available from @POS.COM, San Jose, Calif.) is an example of an web-enabled TC 1261.

An alternative embodiment of the POS system 126 is as a web server where consumers can purchase products.

A walk-through of a typical transaction illustrates the system 100 in situ: A customer of a merchant 120a enters the merchant 120a's POS location or web site having the POS system 126. The customer wishes to purchase a selection of the merchant 120a's goods.

The customer presents to the merchant 120a's sales agent the selected goods. The sales agent identifies each of the selected items—by scanning each past a bar-code scanner (not shown) in the POS system 126, for example. (The currently popular form of marking items for subsequent scanning for purchase is by Uniform Product Code (UPC). The use of UPC is well known in the art and is, therefore, not described herein.) Say, the customer is buying an MP3 player, inter alia.

At some point at the beginning, during or at the end of the transaction, the POS platform 126, the merchant data center 127 and the data farm 140 individually or in concert identify the customer. The customer may, for example, present a credit, debit, loyalty or like card that explicitly and uniquely identifies him to the data farm 140. The system may, for example, identify the consumer by a user name and password, by account number and PIN (personal identification number), or by other combinations of identifier and surety. The system may use a set of heuristics to identify the customer from multiple incomplete but overlapping identifiers (zip code and numbers in street address, for example) that successively exclude candidates from a database of candidates. The system 126, 127 or 140 may, for example, biometrically identify the consumer.

While the items are being identified, the POS system 126 communicates with the merchant data center 127, the data farm 140 or an application service provider 1A0. The result of the communications is that the customer is presented with content that the merchant data center 127, the data center 140 or the ASP 1A0 determines is appropriate for the customer. For example, the customer may see an instantly redeemable coupon for the MP3 player that he is currently purchasing. He may see a coupon for the type of batteries that power the portable stereo he is purchasing. He may see a survey from the merchant 120a regarding service at the merchant 120a's store (or web site) or from a manufacturer regarding consumer electronics. He may see an interactive advertisement.

Each transmitted content encourages the customer to attend to and, as appropriate, to indicate consent to its proposition. For the case of the instantly redeemable coupon, the content encourages the customer to select the coupon by touching an area of the screen of the POS system 126 or clicking on an area of a web page, for example.

A response to a content may be communicated to the data farm 140. The lack of a response, which is of itself useful information, may or may not be explicitly communicated to the data farm 140. Additionally or alternatively, the interactive portion 1261 may be so responsive.

Let's say that the customer sees a discount coupon for 15% off his next purchase of a specific battery brand. The customer indicates his consent to this proposition, which consent the POS platform 126 communicates to the data farm 140.

The data farm 140 associates the customer with a representation of the discount coupon. The representation of the coupon includes all the restrictions of the coupon to apply to a subsequent transaction—the type of item (batteries), the brand of the item (Ray-o-Bunny), a UPC code, expiration date, limitation on quantity, etc. Typically, the coupon restrictions do not identify the merchant 120*a*.

The transaction eventually concludes. At some later date, the customer goes to another merchant 120*b* not associated with the original merchant 120*a*. There he buys a pack of batteries, to which the discount coupon is applicable. The POS platform 126*b* (again, perhaps with the help of a merchant data center 127 or the data farm 140) identifies the customer.

In communications, the data farm 140 and the POS platform 126*b* recognize that the identified consumer has a coupon credit applicable to the transaction at the POS system 126*b*. (The data farm 140 or the merchant 120 may verify the current validity of the credit.) Accordingly, the POS platform 126 credits the consumer the 15% discount for the coupon selected previously at the POS platform 126*a* of the merchant 120*a*.

The data farm 140 and merchant 120*b* again communicate to update the data farm's records. The update indicates that the consumer no longer has the discount (credit) available.

Figure 2:
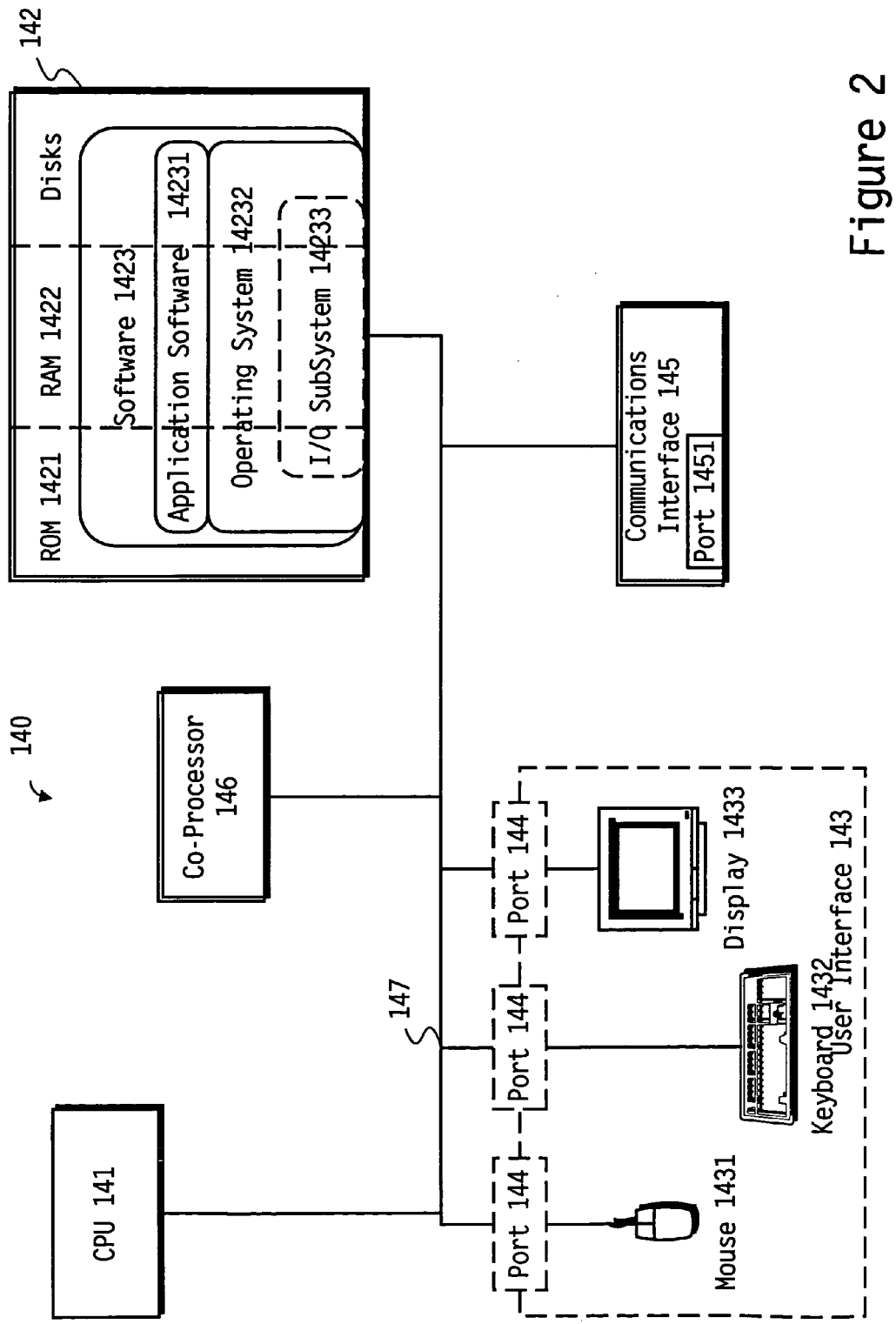
FIG. 2 illustrates the data farm, incorporating an embodiment of the invention.

FIG. 2 illustrates the computer system 140, incorporating an embodiment of the invention. The development host 140 may include the following: a central processing unit ("CPU") 141, a memory 142, a user interface 143, a port 144, a communications interface 145, a co-processor 146 and an internal bus 147. The bus 147 communicatively interconnects the CPU 141, memory 142, user interface 143, port 144, communications interface 145 and co-processor 146. (Of course, in a distributed computing environment, some of these components may be on separate physical machines, as is well understood in the art of distributed computing.)

The memory 142 includes high-speed, volatile random-access memory (RAM) 1422, as well as non-volatile memory such as read-only memory (ROM) 1421 and magnetic disk drives. Further, the memory 142 contains software 1423. The software 1423 is layered: Application software 14231 communicates with the operating system 14232, and the operating system 14232 communicates with the I/O subsystem 14233. The I/O subsystem 14233 communicates with the CPU 141, user interface 143, the communications interface 145 and the co-processor 146 by means of the communications bus 147.

The memory 142 may be programmed according to the methods described herein.

Indeed, the invention now being fully described, one of ordinary skill in the art will readily recognize many changes and modifications that can be made thereto without departing from the spirit or scope of the appended claims. For example, the content to which the consumer may indicate consent is not limited to coupons but includes the array of offers (promotions) known in the advertising art in whatever form. As another example, the merchant 120*b*, not necessarily associated with the original merchant 120*a*, may even compete with the merchant 120*a*. As still another example, the second merchant 120*b* may be an e-tailer 120 that the consumer accesses from his personal computer 190. The type of information generated at one transaction that follows a consumer to another transaction (perhaps at another merchant 120) may be credit, loyalty or other consumer-transaction type information.

This specification incorporates by reference all publications and patent applications mentioned herein, to the same extent if the specification had specifically and individually incorporated by reference each such individual publication or patent application.

What is claimed is:

1. A method, comprising:
    identifying a consumer using a data capture device at a first merchant location where the consumer presents an instrument during a processing of a first transaction at the first merchant, wherein the consumer is identified with a unique identification stored in a data farm device;
    presenting an offer to the consumer on an offer display device, the offer based on information from the first transaction;
    receiving an indication of acceptance of the offer from the consumer at the first merchant location;
    associating the indication of acceptance with the unique identification of the consumer;
    identifying the consumer using a further data capture device at a second merchant location where the consumer presents the instrument during the processing of a second transaction; and
    retrieving the offer based on the identification of the consumer at the second merchant location, wherein the offer is applied to the second transaction.

2. The method of claim 1, wherein the instrument is one of a credit card, a debit card and a customer loyalty card.

3. The method of claim 1, wherein the offer is a discount on merchandise.

4. The method of claim 1, wherein the second merchant location is independent from the first merchant location.

5. The method of claim 1, wherein the information from the first transaction includes an identification of a purchased product.

6. The method of claim 1, further comprising the step of:
    disassociating the indication of acceptance with the unique identification when the consumer completes the second transaction.

7. The method of claim 1, further comprising the step of:
    disassociating the indication of acceptance with the unique identification when the second transaction is incomplete after expiration of a predetermined period of time.

8. A system, comprising:
    a data capture device capturing consumer identification data at a merchant location where a consumer presents an instrument during a processing of a transaction and transaction data from the transaction;
    a data farm device including a unique identification record for the consumer and a plurality of offers, the data farm device receives the consumer identification data to uniquely identify the consumer, and the transaction data, wherein the data farm device selects one of the offers based on the transaction data; and
    an offer display device which receives the one of the offers from the data farm, displays the one of the offers to the consumer at the merchant location, receives an indication of acceptance of the one of the offers from the consumer and forwards the indication of acceptance to the data farm device, wherein the data farm device stores the indication of acceptance in the unique identification record of the consumer in preparation for applying the offer to a second transaction.

9. The system of claim 8, wherein the data capture device and the offer display device are physically located within a single merchant device.

10. The system of claim 8, wherein the data capture device receives at least a portion of the transaction data from one of a cash register and a bar code reader.

11. The system of claim 8, wherein the data farm device is located remotely from the data capture device and receives the consumer identification data and the transaction data via a communications network.

12. The system of claim 11, wherein the communications network is one of an internet and an intranet.

13. The system of claim 8, wherein the instrument is one of a credit card, a debit card and a customer loyalty card.

14. The system of claim 8, wherein the data farm device is a server.

15. The system of claim 8, wherein the unique identification record is a database record.

16. The system of claim 8, further comprising:
a further data capture device capturing the consumer identification data at a further merchant location where the consumer presents the instrument during processing of a further transaction and further transaction data from the further transaction, wherein the data farm device receives the consumer identification data and further transaction data from the further data capture device, retrieves the one of the offers from the unique identification record based on the consumer identification data and the further transaction data and sends the offer to the further merchant location.

17. A method, comprising:
receiving consumer identification data from a data capture device at a merchant location where a consumer presents an instrument during processing of a transaction;
identifying a unique consumer identification record based on the consumer identification data, the unique consumer identification record stored in a data farm device;
receiving transaction data from the transaction;
retrieving an offer based on the transaction data;
sending the offer to an offer display device at the merchant location;
receiving an indication of acceptance of the offer from the consumer at the merchant location; and
associating the indication of acceptance with the unique consumer identification record in preparation for applying the offer to a second transaction.

18. The method of claim 17, further comprising:
receiving the consumer identification data from a further merchant location where the consumer presents the instrument during processing of a further transaction;
identifying the unique consumer identification record based on the consumer identification data;
receiving further transaction data from the further transaction;
retrieving the offer having the indication of acceptance in the unique consumer identification, wherein the further transaction data includes information relating to the offer; and
sending the offer to the further merchant location.

19. The method of claim 18, wherein the offer is a discount on a product and the information in the further transaction data indicates the consumer is purchasing the product.

20. The method of claim 18, wherein the transaction data includes identification of a product purchased by the consumer in the transaction.

* * * * *

UNITED STATES PATENT AND TRADEMARK OFFICE
CERTIFICATE OF CORRECTION

| | | |
|---|---|---|
| PATENT NO. | : 7,571,116 B1 | Page 1 of 1 |
| APPLICATION NO. | : 09/588037 | |
| DATED | : August 4, 2009 | |
| INVENTOR(S) | : Stout | |

It is certified that error appears in the above-identified patent and that said Letters Patent is hereby corrected as shown below:

ON THE TITLE PAGE

On the Title Page, item (56), under "OTHER PUBLICATIONS", in Column 2, Line 1, delete "Obernorf," and insert -- Oberndorf, --, therefor.
(LIST OF REFERENCES CITED BY EXAMINER DATED DECEMBER 13, 2004, PAGE 1 of 1, UNDER "NON-PATENT DOCUMENTS" ENTRY 1, LINE 1)

IN THE SPECIFICATION

In Column 2, Line 54, delete "120", before "occurs".
(ORIGINALLY FILED SPECIFICATION DATED JUNE 5, 2000, PAGE 5, LINE 20)

IN THE CLAIMS

In Column 6, Line 58, in Claim 8, after "consumer" delete "at the merchant location".
(APPEAL BRIEF FILED DATED JUNE 26, 2006, PAGE 12 (PAGE 78 OF FW), CLAIM 37, LINE 10)

In Column 6, Lines 63-64, in Claim 8, after "consumer" delete "in preparation for applying the offer to a second transaction".
(APPEAL BRIEF FILED DATED JUNE 26, 2006, PAGE 12 (PAGE 78 OF FW), CLAIM 37, LINE 13)

In Column 8, Lines 11-12, in Claim 17, after "record" delete "in preparation for applying the offer to a second transaction".
(APPEAL BRIEF FILED DATED JUNE 26, 2006, PAGE 14 (PAGE 80 OF FW), CLAIM 46, LINE 12)

Signed and Sealed this

Ninth Day of February, 2010

David J. Kappos
*Director of the United States Patent and Trademark Office*